United States Patent [19]

Grady et al.

[11] Patent Number: 4,504,859
[45] Date of Patent: Mar. 12, 1985

[54] MULTIPLE X-RAY IMAGE SCANNERS

[75] Inventors: John K. Grady, 300 Foster St., Littleton, Mass. 01460; Richard E. Rice, Arlington, Mass.

[73] Assignee: John K. Grady, Littleton, Mass.

[21] Appl. No.: 457,678

[22] Filed: Jan. 13, 1983

[51] Int. Cl.³ .............. H04N 7/18; G03B 41/16; H01J 40/14
[52] U.S. Cl. .................... 358/111; 378/99; 250/578
[58] Field of Search .......... 358/111; 250/578; 378/99, 100

[56] References Cited

U.S. PATENT DOCUMENTS

| | | | |
|---|---|---|---|
| 3,892,967 | 7/1975 | Grady et al. | 250/447 |
| 4,207,595 | 6/1980 | Dittrich et al. | 358/111 |
| 4,342,914 | 8/1982 | Bjorkholm | 358/111 |
| 4,355,331 | 10/1982 | Georges et al. | 358/111 |
| 4,383,170 | 5/1983 | Takagi et al. | 250/578 |
| 4,404,591 | 9/1983 | Bonar | 358/111 |

Primary Examiner—Howard W. Britton
Assistant Examiner—Victor R. Kostak
Attorney, Agent, or Firm—James H. Grover

[57] ABSTRACT

X-ray apparatus has a scintillation screen showing a light image in an area viewed by two or more video camera tubes. The tubes receive a projection of the light image in two different ranges of light intensities and generate electrical signals corresponding to the light intensities. The signals are combined to reconstruct the image. Alternatively two or more camera tubes view different portions of the image area generating multiple signal outputs which are reconstructed in a single, continuous display.

18 Claims, 4 Drawing Figures

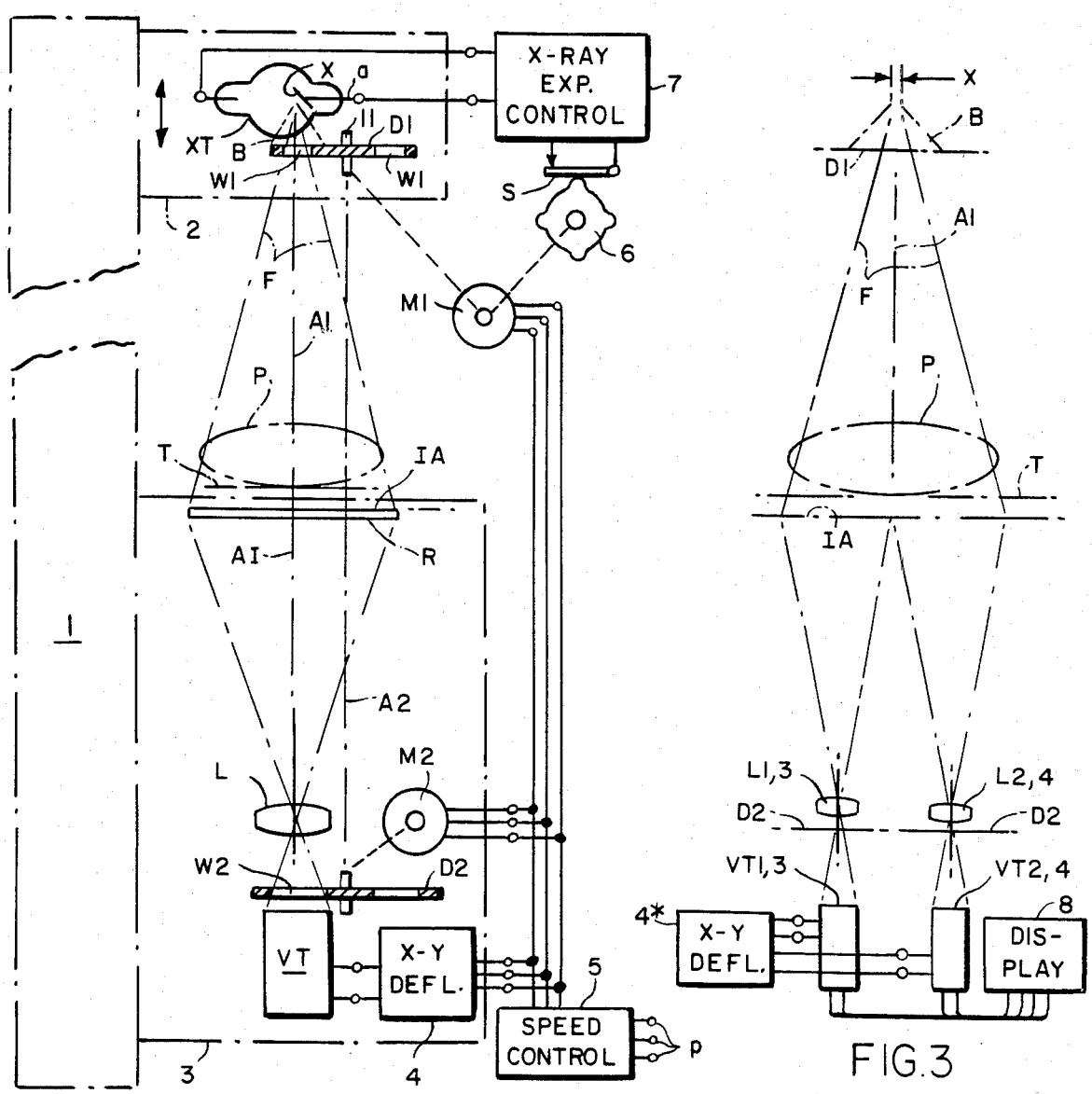
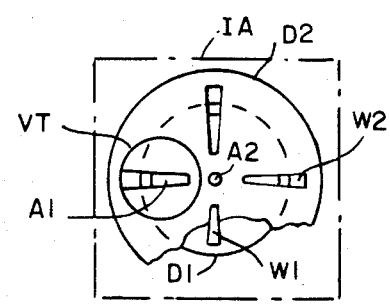
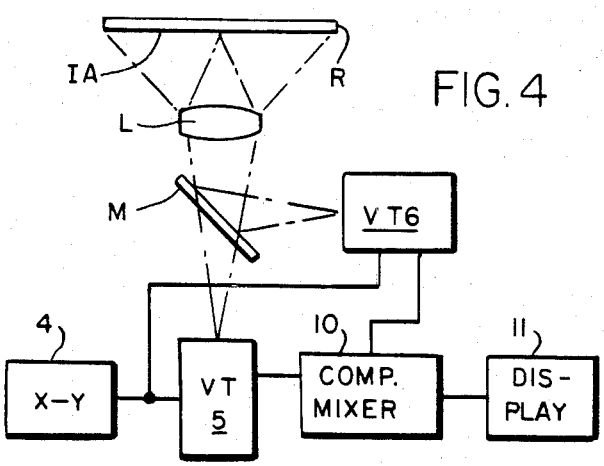
FIG.1
FIG.2
FIG.3
FIG.4

MULTIPLE X-RAY IMAGE SCANNERS

BACKGROUND OF THE INVENTION

Most modern X-ray hospital equipment not only records images on radiographic plates but also can produce a secondary light image on a scintillation screen which may be viewed directly, photographed with a still or moving picture camera or, as is relevant to the present invention, the secondary light image may be viewed with a flying spot scanner which converts the secondary image into corresponding electrical signals for display on a cathode ray tube, for example. The term flying spot scanners includes inter alia mechanical photoelectric facsimile scanners, television camera tubes of all types, image intensifiers, solid state photoelectric linear and area viewers externally- or self-scanned such as self-scanned photodiode arrays, charge injection devices and charge coupled devices (e.g. Fairchild CCD, Palo Alto, Calif.) and like scanners.

All these flying spot scanners rely on the photoelectric effect, whereas a scintillation screen produces its secondary light image by luminescence. Consequently the dynamic range of the scanners and screen differ considerably. Dynamic range is the ratio of the brightest to the least bright light point of an image source such as the scintillation screen, or the ratio of brightest to least bright light intensity which a flying spot scanner can resolve. The dynamic range of the screen will be influenced by the type of X-ray procedure, the X-ray tube voltage, the dimensions and proportions of bone, tissue and air of the subject. The light from a scintillation screen, taking into account the loss in the lens system projecting the image on the scanner, can vary throughout the image with a dynamic range of 1000. A typical television camera tube for such low light levels has a linear response over a dynamic range of only 100 to 150. Thus a typical camera tube can respond linearly to only a fraction, e.g., one tenth, of the dynamic light range of an available scintillation screen. Obviously detail, resolution and contrast are lost in converting the scintillation image to electrical signals.

Additionally the optical inefficiency of the lens system projecting the scintillation image on the scanner reduces light received by the tube not only generally but particularly by operation of the cosine law which reduces light from the corners of the scintillation screen image most remote from its center. The particular light reduction distorts and reduces contrast in the portions of the electrical signal and display corresponding to the corners of the scintillation image.

Accordingly it is the object of the present invention to provide electro-optical apparatus which reproduces substantially the full dynamic range of light intensity values throughout an image area.

SUMMARY OF THE INVENTION

According to the invention apparatus for converting to electrical signals an image area having a range of light intensity values at the area, apparatus comprises two or more electro-optical means viewing the image area and including optical means distributing light from the image area, and electrically responsive means generating electrical signals respectively corresponding to light intensities from the area viewed.

In one more specific aspect the respective electro-optical means view substantially different portions of the image area such as the four quadrants of a rectangular secondary image area. And in another form the plural electro-optical means view substantially the same image area, and each electro-optical means generates electrical signals corresponding to different ranges of light intensity.

DRAWINGS

FIG. 1 is an optical diagram of an X-ray system producing a visible image according to the invention showing structural parts, including a moving mask, schematically;

FIG. 2 is a view along the radiation axis of FIG. 1; and

FIGS. 3 and 4 are optical diagrams of alternate forms of the invention.

DESCRIPTION

In the X-ray system of FIGS. 1 and 2 the X-radiation source is the focal spot X on the anode a of an X-ray tube XT. From the source X a pyramidal or conical beam B is radiated on a radiation axis A1 through the position P of a subject such as a human patient on an X-ray transmissive support table T. Beyond the patient position P is an X-ray receptor R having an X-ray responsive imaging area or plane IA of width W. Typically the receptor is a scintillation screen emitting visible secondary radiation on receipt of X-rays, but other known radiation receptors such as film may be used. The secondary radiation image at the area IA is viewed on the axis A1 by electro-optical utilization means including one of the flying spot scanners previously mentioned such as a video camera tube VT, which converts the secondary image into a frame of electrical video signals corresponding to the subject under examination, and a lens system L which projects the secondary image onto the light responsive surface at the receiving end of the tube VT. The secondary image may also be projected by fibre optics to a photodiode array.

The X-ray tube XT is mounted in a first carriage 2 capable of reciprocal movement on a main frame 1 toward and away from the patient position P. The receptor R, and electro-optical system, lens L and video tube VT, are mounted in a second carriage 3 similarly supported reciprocally on the main frame 1. The patient table T is usually supported independently of the main frame 1 and carriages 2, 3, as shown, for example, in U.S. Pat. No. 3,892,967.

The X-ray beam B is partially intercepted by an X-ray opaque mask comprising a first rotating disk D1 typically having four X-ray transmissive slits or windows W1. As shown in FIG. 2 the windows W1 are sectoral and will transmit a fan-shaped scanning X-ray beam F while the disk D1 masks the remainder of the conical beam B from the receptor R. The windows might, however, be parallel sided rectangular slits in a belt moving linearly or reciprocating through the X-ray beam B. Hereinafter the term "window width" refers to the average width of a sectoral window or the constant width of a rectangular window. A similar but larger rotating disk D2 with four light transmissive windows W2 is located between the lens L and video tube VT before the image plane of lens L. The two disks D1, D2 are rotated on a common axis A2 by synchronous motors M1, M2 respectively. As shown in FIG. 2 the windows W1, W2 of the disks are optically superimposed so that, as the first disk mask D1 is synchronously driven by connection through a speed control 5 to clock regulated alternating current power terminals p, the second disk windows W2 scan the secondary image area IA substantially simultaneously with the scanning of the same area by the first disk windows W1. The X-Y deflection circuit 4 for the video tube scanner is also connected to the synchro control terminals p so that its scan is coordinated with the mask means. With a scintillation screen of very brief image persistence the scan by the video tube is substantially simultaneous with scanning by the masks. But the receptor may include secondary image storage.

The X-ray tube XT is energized by an electronic X-ray exposure control 7 linked through the motor M1 to the power terminals p. For purposes of illustration a mechanical analog of the electronic control is shown. The analog comprises a rotary cam 6 closing a switch S in synchronism with the disk D1 such that the X-ray exposure control 7, in response to closure of the switch S energizes the X-ray tube XT substantially only during the times when the X-ray mask windows W1 are transmissive of X-rays to the image area IA of the receptor and not when the transmitted fan beam is beyond the image area, thus reducing power requirements and scattered X-radiation, and increasing the instantaneous power capacity of the tube.

As shown in FIG. 3 a significant improvement in efficiency of the electro-optical system of lens optics and flying spot scanner can be realized if a plurality of lenses and scanners view discrete and separate areas of the secondary image of the receptor R at the plane IA. Preferably the image area is divided into four quadrants respectively viewed by four electro-optical systems L1, VT1; L2, VT2; L3, VT3; and L4, VT4, the third and fourth of these systems being behind the first and second as viewed in FIG. 3. The four video tubes are controlled by an X-Y deflection circuit 4* modified to synchronize scan of the respective tubes so that the scan lines effectively join as they pass from one quadrant of the image area to another. The respective outputs of the four scanner tubes are supplied to a display 8 such as a cathode ray tube with the same synchronism as the scanning so as to reconstruct the four image quadrants in one continuous display image.

Each of the four lenses is disposed to view the corners of its respective quadrant at a smaller angle thus reducing the cosine law loss of brightness at the corners of the whole image. Also each of the four lenses L1–L4 is substantially shorter in focal length than the single lens L of FIGS. 1 and 4, and can be faster because of their shorter focal length. Additionally the signal to noise ratio of the image on the display 11 is greatly improved by the viewing of the scintillation screen image with multiple lenses and scanner tubes.

In the apparatus of FIG. 4 a secondary image is produced by X-rays on the image area of a radiation receptor R as previously described. The image at the area IA is projected by a lens system represented by the simple lens L1 via a semireflector M onto the light responsive areas of two video camera tubes VT5 and VT6. That is, both camera tubes view substantially the same area of receptor R. The semireflector M, for example a pellicle mirror, transmits a fraction of light from the secondary image to the first camera tube VT5, and reflects the remaining fraction to the second tube VT6. A pellicle mirror is a very thin transparent membrane which is supported by a flat metal frame. The ratio of reflectance to transmittance is determined by vacuum evaporation coating with a metal such as silver or aluminum. The proportion of transmitted and reflected light can be varied by selecting mirrors with different amounts of reflection so that the light intensities falling on the video tubes VT5 and VT6 correspond to different, although preferably overlapping, ranges of light intensities of the image area viewed. The scanning by both video tubes is synchronized or otherwise coordinated by a common X-Y deflection generator 4 connected to both tubes. The electrical signals generated by both tubes are fed through connections to a computer 10 which includes a mixer for combining the respective signals to reconstruct electrically the original image area and transmit the resulting mixed signal through a coupling to a display 11 of the reproduced image.

As previously mentioned, the light intensities at the image area IA may extend over a dynamic range of 1000, whereas the range of the video tubes VT5, VT6 may be only 100. For example, if the scintillation screen (IA of FIG. 4) is of the well-known $Gd_2O_2S$ type, and if a scintillation light image having a dynamic range of 1000 is focused by a lens onto the face of a single low light level silicon intensifier target tube (SIT), such as the RCA 4804/H, the tube face illuminance could typically be in the range $1 \times 10^{-5}$ to $1 \times 10^{-2}$ lumens per square foot, which is approximately ten times greater than the linear response range of the tube. But, for example by, selecting a semireflector M which transmits 90% of incident image light to the first video tube VT5 and reflects 10% to the second tube, the first video tube will then receive light in a dynamic range from 0.9 hundred thousandth to 0.9 hundredths, approximately the 1000 dynamic range of the scintillation image. In this range the first tube will respond with fidelity only to the intensities from 0.9 thousandth to 0.9 hundred thousandth, the lower hundredth of the image dynamic range. However, the second video tube VT6 will receive light corresponding to the full dynamic range of the image, but reduced to 10% of the intensity by the low reflectance of the semireflector M. As a result of the ten fold reduction of the image light intensity the maximum intensity of the reflected image is within the range of VT6. Thus the two tubes together respond substantially to the full 1000 dynamic range of the image area, all within the capabilities of their individual dynamic ranges of 100. Expressed concisely the image area dynamic range from $10^{-5}$ to $10^{-2}$ lumens per square foot is covered by the dynamic range of $0.9 \times 10^{-5}$ to $0.9 \times 10^{-3}$ of video tube 5 and the dynamic range of the second tube VT6, also $0.9 \times 10^{-5}$ to $0.9 \times 10^{-3}$. The brighter portion of the image area is converted to electrical signals with substantial fidelity by the first tube, and the less bright portion by the second tube, there being an overlap of the effective dynamic ranges of one order between $0.9 \times 10^{-4}$ and $0.9 \times 10^{-3}$ lumens per square foot.

Thus the use of two tubes, each with a range of 100, increases the range of the two tubes not to $100+100=200$ but rather almost by the power of two, i.e. almost $100^2 = 10,000$. With three tubes the range is increased to almost the third power, i.e. almost $100^3 = 1,000,000$. Light from the image is distributed to the three tubes by crossed semireflectors (an additional pellicle mirror at 90° to the mirror M shown in FIG. 4). Wherever a plurality of tubes are used with semireflectors the proportion of transmission to reflection can be selected to meet the respective dynamic tube ranges needed to cover the image range.

However many video tubes view the image area, all their signals are continuously processed by the computer 10 which includes means for gating one signal at a time to the display 11 as the tubes scan the image spot by spot. In the apparatus of FIG. 4 the signal from a tube of one dynamic range is selected for gating when the instantaneously scanned spot has an intensity value greater or less than a crossover intensity value in the overlap or limit of the adjacent dynamic range of another tube. When the intensity of successively scanned spots passes through the crossover value to a value in the range of another tube, the signal of that other tube is gated to the display. Thus a continuous signal alternatively derived from two or more tubes is displayed.

It should be understood that the present disclosure is for the purpose of illustration only and that this invention includes all modifications and equivalents which fall within the scope of the appended claims.

We claim:

1. For converting to electrical signals an image area having a range of light intensity values at the area, apparatus comprising:
   an X-ray source;
   a scintillation screen having an image area responsive to X-rays from the source to produce a secondary, light image at the area;
   two or more electro-optical means viewing the image area and including optical means distributing light from the image area including optical means simultaneously separating the secondary image into at least two images with different intensity patterns and directing the different images simultaneously on separate paths, and at least two photoelectrically responsive means, one in each path, and each generating electrical area signals respectively corresponding to light intensities from the area viewed.

2. Apparatus according to claim 1 wherein the viewing means are flying spot scanners and including means to control the spot scanning.

3. Apparatus according to claim 1 including means for utilization of the electrical signals.

4. Apparatus according to claim 1 including a display for the electric signals.

5. Apparatus according to claim 1 including computer controlled means for combining the respective area signals electrically to reconstruct the image area.

6. Apparatus according to claim 5 wherein the combining means includes means merging successive area signals to reconstruct successively generated area signals.

7. Apparatus according to claim 5 wherein the combining means includes means effectively superimposing respective area signals.

8. Apparatus according to claim 5 wherein the viewing means are flying spot scanners and including means to coordinate the spot scanners and the combining means.

9. Apparatus according to claim 1 wherein at least two electro-optical means are disposed to view substantially the same image area, each electro-optical means including light responsive means generating electrical signals corresponding to different ranges of light intensity at the image area.

10. Apparatus according to claim 9 wherein the electro-optical means includes optical means for distributing light from the image area to respective light responsive means.

11. Apparatus according to claim 9 wherein the effective response ranges of the respective electro-optical means extend substantially over the range of light intensity values at the image area.

12. Apparatus according to claim 1 wherein a plurality of electro-optical means are disposed to view substantially different portions of the image area.

13. Apparatus according to claim 12 wherein four flying spot scanners view respective quadrants of the secondary images.

14. Apparatus according to claim 12 wherein the electro-optical means are flying spot scanners.

15. Apparatus according to 14 including common scan deflection means controlling the plural scanners.

16. Apparatus according to claim 9 wherein the electro-optical means includes a semi-reflector receiving light from the image area and distributing different intensity proportions of the received light to respective light responsive means so that the respective electro-optical means have different effective ranges of response to the light at the image area.

17. Apparatus according to claim 16 wherein the semi-reflector has different transmittance and reflectance characteristics.

18. Apparatus according to claim 17 wherein the transmittance and reflectance characteristics are in a proportion, other than one, such that the combined intensity ranges of two or more photoelectric response means substantially equal the range of light intensities of the secondary image.

* * * * *